United States Patent [19]
Hoffmann et al.

[15] 3,700,687
[45] Oct. 24, 1972

[54] (THIONO) PHOSPHORIC (PHOSPHONIC)-ACID ESTERS

[72] Inventors: Hellmut Hoffmann, Wuppertal-Elberfeld; Ingeborg Hammann, Cologne; Bernhard Homeyer, Opladen, all of Germany

[73] Assignee: Farbenfabriken Bayer Aktiengesellschaft, Leverkusen, Germany

[22] Filed: March 31, 1970

[21] Appl. No.: 24,397

[30] Foreign Application Priority Data
April 15, 1969  Germany..........P 19 17 741.4

[52] U.S. Cl................260/310 R, 260/923, 424/200
[51] Int. Cl...........................C07d 49/18, C07f 9/40
[58] Field of Search...............................260/310 R

[56] References Cited

UNITED STATES PATENTS

| | | | |
|---|---|---|---|
| 2,754,244 | 7/1956 | Gysin et al. | 260/310 R |
| 3,216,894 | 11/1965 | Lorenz et al. | 260/310 R |
| 3,232,830 | 2/1966 | Schrader et al. | 260/310 R |

FOREIGN PATENTS OR APPLICATIONS

| | | | |
|---|---|---|---|
| 300,741 | 10/1954 | Switzerland | 260/310 R |
| 300,758 | 10/1954 | Switzerland | 260/310 R |

OTHER PUBLICATIONS

Abramov et al. J. Gen. Chem. (USSR) Vol. 38, Page 2715 (1968).
Arbuzov et al. Chem. Abst. Vol. 60, Columns 4127–4128 (1964).
Chemical and Engineering News Vol. 30, No. 43, Pages 4513– 4526 (1952, Oct. 27, 1952).
Zinov' ev J. Gen. Chem. (USSR) Vol. 39, Pages 574–575 (1969, Mar. 1969).

*Primary Examiner*—Natalie Trousof
*Attorney*—Burgess, Dinklage & Sprung

[57] ABSTRACT

Esters of (thiono) phosphoric or phosphonic acid esters and ester amides as the acid moiety and [3-methyl-5-hydroxy-pyrazolyl-1]-(thiono) phosphoric or phosphonic acid esters as the alcohol moiety, which possess arthropodicidal, especially acaricidal and insecticidal, properties, and which may be produced by conventional methods.

12 Claims, No Drawings

(THIONO) PHOSPHORIC (PHOSPHONIC)-ACID ESTERS

The present invention relates to and has for its objects the provision of particular new esters of (thiono) phosphoric or phosphonic acid esters and ester amides as the acid moiety and [3-methyl-5-hydroxy-pyrazolyl-1]-(thiono) phosphoric or phosphonic acid esters as the alcohol moiety, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combatting pests, e.g., arthropods, especially insects and acarids, with other and further objects becoming apparent from a study of the within specification and accompanying examples.

From U.S. Pat. No. 2,754,244 it is known that 0,0-dialkyl-0-[3-methyl-pyrazolyl-(5)-phosphoric and -thiono-phosphoric-acid acid esters possess insecticidal and acaricidal activity.

It has now been found, in accordance with the present invention, that the particular new (thiono) phosphoric (phosphonic)-acid esters and ester amides of the general formula

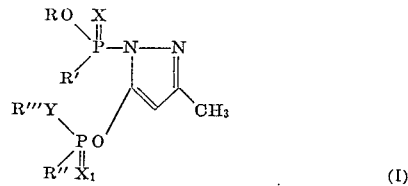

in which
R and R''' are straight-chain or branched lower alkyl
X and $X_1$ are oxygen or sulphur,
Y is oxygen, NH— or NR'''—,
R'' is straight-chain or branched lower alkyl, lower alkoxy, mono-lower alkylamino or di-lower alkylamino or aryl,
R' is straight-chain or branched lower alkyl or lower alkoxy, exhibit strong arthropodicidal, especially insecticidal and acaricidal, properties.

It has been furthermore found, in accordance with the present invention, that the particular new compounds of formula (I) above may be produced by a process which comprises reacting an alkali metal salt of substituted pyrazole of the general formula

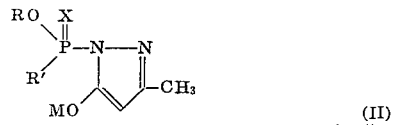

in which
R,R' and X have the abovementioned significance and
M is an alkali metal, preferably sodium,
with a (thiono) phosphoric (phosphonic)-acid ester halide or -amide halide of the general formula

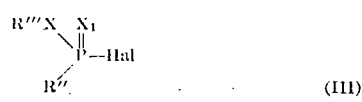

in which
R''', R'' and $X_1$ have the abovementioned significance and
Hal is halogen, preferably chlorine or bromine.

Surprisingly, the particular new (thiono) phosphoric (phosphonic)-acid esters and ester amides of formula (I) above according to the invention possess a significantly higher insecticidal and acaricidal action, especially a considerably better activity against sucking and biting insects than the 0,0-dialkyl-0-[3-methyl-pyrazolyl-(5)]-phosphoric- and thionophosphoric-acid esters of analogous constitution known from the patent specification mentioned above. The compounds of the present invention therefore represent a valuable contribution to the art.

Where 0,0-diethyl-thionophosphoric-acid ester chloride and the sodium salt of 0,0-diethyl-(3-methyl-5-hydroxy-pyrazolyl-1)-thionophosphoric-acid ester are used as starting substances for the process, the course of the reaction can be illustrated by the following formula scheme:

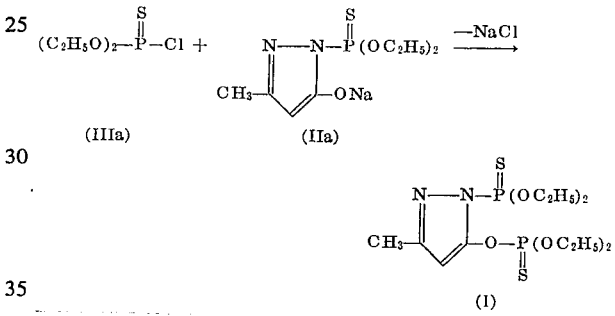

The pyrazole derivatives and the acid halides to be used for the manufacturing process are clearly defined by the general formulas (II) and (III), respectively, given above.

Advantageously, in accordance with the present invention, in the various formulas herein:
R AND R''' represent
straight and branched chain lower alkyl of one to four carbon atoms such as methyl, ethyl, n- and iso-propyl, n-, iso-, sec.- and tert.-butyl, and the like, especially $C_{1-3}$ alkyl;
R' represents
straight and branched chain lower alkyl or lower alkoxy of one to four carbon atoms such as methyl to tert.-butyl and methoxy to tert.-butoxy inclusive as defined above, and the like, and especially $C_{1-3}$ alkyl or alkoxy;
R'' represents
aryl or straight or branched alkyl, alkoxy, monoalkylamino or dialkylamino with one to four carbon atoms in each alkyl group, and preferably phenyl or straight or branched alkyl, alkoxy, monoalkylamino or dialkylamino with one to three carbon atoms in each alkyl group;
X and $X_1$ represent
oxygen or sulphur, and
Y represents
oxygen, NH— or NR'''—.

The alkali metal salts, preferably sodium salts, of the pyrazole derivatives of formula (II) which are used as starting materials are not known but can be made by reacting alkali metal alcoholates with the appropriate phosphorylated hydrazonocarboxylic acid ester derivatives with ring closure occurring in accordance with the following formula scheme:

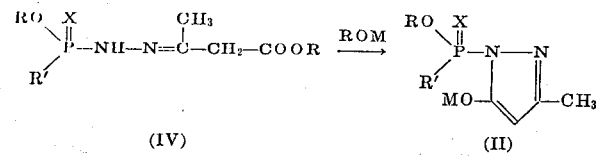

(IV)            (II)

As examples of pyrazole derivatives of formula (II) above which can be used according to the present invention, there may be mentioned, for instance: the alkali metal salts such as lithium or potassium but preferably sodium salts, of 1-(0,0-dimethyl-phosphoryl)-, 1- (0,0-diethyl-phosphoryl)-, 1-(0,0-dipropyl-phosphoryl)-, 1-(0,0-di-iso-propyl-phosphoryl)-, 1-(0-ethyl-0-butyl-phosphoryl)-, 1-(0,0-di-sec.-butyl-phosphoryl)-, 1-(0-methyl-methane-phosphonyl)-, 1-(0-ethyl-ethane-phosphonyl)-, 1-(0-propyl-methane-phosphonyl)-, propyl-methane-phosphonyl)-, 1-(0-iso-propyl-ethane-phosphonyl), 1-(0-butyl-ethane-phosphonyl)-, 1-(0-tert. butyl-tert. butane-phosphonyl)- as well as 1-(0-methyl-0-ethyl-phosphoryl)- and 1-(0-ethyl-0-propyl-phosphoryl)-3-methyl-5-hydroxypyrazoles, and the corresponding thionophosphoryl and thionophosphonyl derivatives.

Examples of acid halides of formula (III) which can be used according to the present invention include the following: 0,0-dimethyl-, 0,0-diethyl-, 0,0-dipropyl-, 0,0-di-iso-propyl-, 0,0-dibutyl-, 0,0-di-sec.-butyl, 0-methyl-0-ethyl-, 0-ethyl-0-propyl-phosphoric-acid ester chlorides, 0-methyl-methane, 0-ethyl-ethane-, 0-propyl-propane-, 0-iso-propyl-ethane-, 0-methyl-phenyl-, 0-ethyl-phenyl-, 0-propyl-phenyl-, 0-butyl-phenyl-, 0-sec.-butyl-phenyl-phosphonic-acid ester chloride and bromide and their thiono analogues, di-(N,N-dimethyl)-, di-(N,N-diethyl)-, di-(N,N-di-propyl)- and di-(N,N-dibutyl)-phosphoric-acid diamide chloride and bromide and the corresponding thiono compounds, as well as 0-ethyl-N-isopropylphosphoric-acid ester amide chloride and the thiono-analogue.

The production reaction is preferably carried out in the presence of a solvent (which term includes a mere diluent). As such, practically all inert organic solvents are suitable. These preferably include (optionally chlorinated) hydrocarbons, such as benzine, benzene, toluene, xylene, chlorobenzene as well as dichloromethane, dichloroethane, chloroform, carbon tetrachloride and the like; ethers, for example diethyl and dibutyl ether, dioxan; as well as low-boiling aliphatic ketones, for example acetone, methylethyl ketone, methylisopropyl ketone, methylisobutyl ketone and the like.

The reaction temperatures can be varied within a fairly wide range. In general, the reaction is carried out at substantially between about 0° to 100° C, and preferably between about 40° to 70° C. The reaction is generally carried out at atmospheric pressure.

In carrying out the process, the starting substances are generally employed in equimolar ratios. The reaction may be made to take place in the usual manner by bringing the reactants together in one of the abovementioned solvents. After stirring the mixture for several hours at elevated temperature, it is poured into water and extracted by shaking with benzene, and the solvent is subsequently distilled off after drying.

The (thiono) phosphoric (phosphonic)-acid esters and ester amides according to the invention are mostly obtained in the form of colorless to slightly yellow-colored, viscous, water-insoluble oils which cannot be distilled without decomposition; they can however be freed of the last volatile constituents by so-called "slight distillation," i.e., by prolonged heating under reduced pressure to moderately elevated temperatures, and can be purified in this manner. They are readily characterizable by their refractive indices.

As already mentioned above, the compounds according to the present invention are distinguished by outstanding insecticidal and acaricidal properties. They possess at the same time excellent activity both against insects which attack plants through the leaf and against harmful soil insects, as well as household pests and pests of stored products. The new substances furthermore in part show fungicidal activity against genuine mildew fungi and furthermore cause inhibition of growth or stoppage of growth when used in larger amounts. They can also be used as rodenticides. The pesticidal action starts rapidly and continues for a long time. For this reason the compounds according to the invention may be used in plant protection and in the protection of stored products, as well as in hygiene for combating sucking and biting insects, Diptera and mites (Acarina). In this context, the excellent activity of the products against phosphoric acid ester-resistant strains of spider mites should be particularly mentioned.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apply aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus;* and the like.

In the case of the biting insects contemplated herein, above all there should be mentioned butterfly caterpillars lepidoptera) such as the diamond-back moth (*Plutella maculipennis*), the gipsy moth (*Lymantria dispar*), the brown tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kuh-

*niella*) and greater wax moth (*Galleria mellonella*); and the like.

Also to be classed with the biting insects contemplated herein are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), but also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*) the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius = Tetranychus althaeae* or *Tetranychus urticae*) and the European red mite (*Paratetranychus pilosus = Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

Significantly, when used against household pests and pests of stored products, particularly flies and mosquitoes, the instant active compounds are also distinguished by an outstanding residual effect on wood and clay as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols, (e.g., glycol monomethyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alimina, silica, chalk, i.e., calcium carbonate, talc, kieselguhr, etc.) and ground synthetic minerals (e.g., highly dispersed silicic acid, silicates, e.g., alkali silicates, etc. ); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.00001–20 percent, preferably 0.01–5 percent by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combating or controlling pests, e.g., arthropods, i.e., insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e., an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples

EXAMPLE 1

*Phaedon larvae test*
Solvent Emulsifier:    3 parts by weight acetone
                       1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with this preparation of the given active compound until dripping wet and then infested with mustard beetle larvae (*Phaedon cochleariae*).

After the specified period of time, the degree of destruction of the pests is determined and expressed as a percentage: 100 percent means that all and 0 percent means that none of the beetle larvae are killed.

The particular active compounds tested, their concentrations, the evaluation time and the results obtained can be seen from the following Table 1

TABLE 1
Phaedon larvae test

| Active compound (constitution) | Active compound concentration in percent | Degree of destruction in percent after 3 days |
|---|---|---|
| (A) 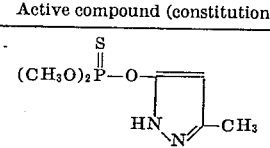 (known) | 0.1 | 0 |
| (2) 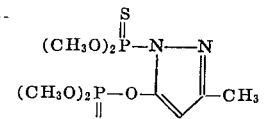 | 0.1<br>0.01 | 100<br>100 |
| (3) 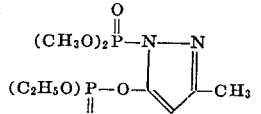 | 0.1<br>0.01 | 100<br>100 |
| (4) 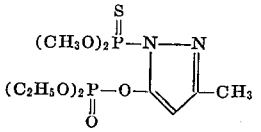 | 0.1<br>0.01 | 100<br>100 |
| (5) 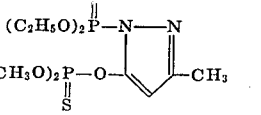 | 0.1<br>0.01 | 100<br>100 |
| (6) 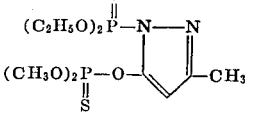 | 0.1<br>0.01 | 100<br>95 |
| (1) 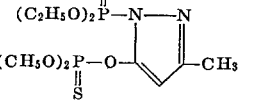 | 0.1<br>0.01<br>0.001 | 100<br>100<br>100 |
| (7) 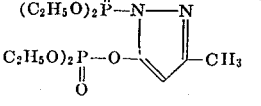 | 0.1<br>0.01 | 100<br>100 |
| (8) 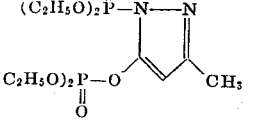 | 0.1<br>0.01 | 100<br>100 |

TABLE 1—Continued
Phaedon larvae test

| Active compound (constitution) | Active compound concentration in percent | Degree of destruction in percent after 3 days |
|---|---|---|
| (9) $(CH_3O)_2\overset{S}{\overset{\|}{P}}-N-\!\!-\!\!N$ with $C_2H_5-\overset{}{\underset{C_2H_5O}{P}}-O-\!\!\!\!\overset{}{\underset{S}{\|}}-CH_3$ | 0.1 / 0.01 | 100 / 100 |
| (10) $(C_2H_5O)_2\overset{S}{\overset{\|}{P}}-N-\!\!-\!\!N$ with $C_2H_5-\overset{}{\underset{C_2H_5O}{P}}-O-\!\!\!\!\overset{}{\underset{S}{\|}}-CH_3$ | 0.1 / 0.01 | 100 / 100 |
| (11) $(C_2H_5O)_2\overset{S}{\overset{\|}{P}}-N-\!\!-\!\!N$ with $C_2H_5O-P-O-\!\!\!\!-CH_3$ (phenyl, S) | 0.1 / 0.01 | 100 / 100 |
| (12) $C_2H_5,\ C_2H_5O-\overset{S}{\overset{\|}{P}}-N-\!\!-\!\!N$ with $(CH_3O)_2P-O-\!\!\!\!-CH_3$ ($\|S$) | 0.1 / 0.01 | 100 / 100 |
| (13) $C_2H_5,\ C_2H_5O-\overset{S}{\overset{\|}{P}}-N-\!\!-\!\!N$ with $(C_2H_5O)P-O-\!\!\!\!-CH_3$ ($\|S$) | 0.1 / 0.01 | 100 / 100 |
| (14) $C_2H_5,\ C_2H_5O-\overset{S}{\overset{\|}{P}}-N-\!\!-\!\!N$ with $(C_2H_5O)_2P-O-\!\!\!\!-CH_3$ ($\|O$) | 0.1 / 0.01 | 100 / 95 |
| (15) $C_2H_5,\ C_2H_5O-\overset{S}{\overset{\|}{P}}-N-\!\!-\!\!N$ with $C_2H_5-\overset{}{\underset{C_2H_5O}{P}}-O-\!\!\!\!\overset{}{\underset{S}{\|}}-CH_3$ | 0.1 / 0.01 | 100 / 100 |
| (16) $(C_2H_5O)_2\overset{S}{\overset{\|}{P}}-N-\!\!-\!\!N$ with $(CH_3)_2N,\ (CH_3)_2N-P-O-\!\!\!\!-CH_3$ ($\|O$) | 0.1 | 100 |
| (17) $C_2H_5,\ C_2H_5O-\overset{S}{\overset{\|}{P}}-N-\!\!-\!\!N$ with $(CH_3)_2N,\ (CH_3)_2N-P-O-\!\!\!\!-CH_3$ ($\|O$) | 0.1 | 100 |

EXAMPLE 2

Plutella test
Solvent Emulsifier: 3 parts by weight of acetone
1 part by weight of alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration.

Cabbage leaves (*Brassica oleracea*) are sprayed with the preparation of the active compound until dew moist and are then infested with caterpillars of the diamond-back moth (*Plutella maculipennis*).

After the specified period of time, the degree of destruction is determined as a percentage: 100 percent means that all the caterpillars are killed whereas 0 percent means that none of the caterpillars are killed.

The active compounds, the concentrations of the active compounds, the evaluation times and the results can be seen from Table 2.

TABLE 2
Plutella test

| Active compound (constitution) | Active compound concentration in percent | Degree of destruction in percent after 3 days |
|---|---|---|
| (A) $(CH_3O)_2\overset{S}{\overset{\|}{P}}-O-\!\!\!\!-CH_3$ (HN,N) (known) | 0.1 | 0 |
| (B) $(C_2H_5O)_2\overset{S}{\overset{\|}{P}}-O-\!\!\!\!-CH_3$ (HN,N) (known) | 0.1 / 0.01 | 100 / 0 |
| (4) $(CH_3O)_2\overset{S}{\overset{\|}{P}}-N-\!\!-\!\!N$ with $(C_2H_5O)_2P-O-\!\!\!\!-CH_3$ ($\|O$) | 0.1 / 0.01 | 100 / 100 |
| (5) $(C_2H_5O)_2\overset{S}{\overset{\|}{P}}-N-\!\!-\!\!N$ with $(CH_3O)_2P-O-\!\!\!\!-CH_3$ ($\|S$) | 0.1 / 0.01 / 0.001 | 100 / 100 / 100 |
| (6) $(C_2H_5O)_2\overset{O}{\overset{\|}{P}}-N-\!\!-\!\!N$ with $(CH_3O)_2P-O-\!\!\!\!-CH_3$ ($\|S$) | 0.1 / 0.01 | 100 / 100 |
| (1) $(C_2H_5O)_2\overset{S}{\overset{\|}{P}}-N-\!\!-\!\!N$ with $(C_2H_5O)_2P-O-\!\!\!\!-CH_3$ ($\|S$) | 0.1 / 0.01 / 0.001 | 100 / 100 / 100 |
| (7) $(C_2H_5O)_2\overset{S}{\overset{\|}{P}}-N-\!\!-\!\!N$ with $(C_2H_5O)_2P-O-\!\!\!\!-CH_3$ ($\|O$) | 0.1 / 0.01 | 100 / 100 |
| (8) $(C_2H_5O)_2\overset{O}{\overset{\|}{P}}-N-\!\!-\!\!N$ with $(C_2H_5O)_2P-O-\!\!\!\!-CH_3$ ($\|O$) | 0.1 / 0.01 | 100 / 95 |
| (9) $(CH_3O)_2\overset{S}{\overset{\|}{P}}-N-\!\!-\!\!N$ with $C_2H_5-\overset{}{\underset{C_2H_5O}{P}}-O-\!\!\!\!\overset{}{\underset{S}{\|}}-CH_3$ | 0.1 / 0.01 | 100 / 85 |

TABLE 2—Continued

Plutella test

| Active compound (constitution) | Active compound concentration in percent | Degree of destruction in percent after 3 days |
|---|---|---|
| (10) (C₂H₅O)₂P(S)−N−N, C₂H₅−P(S)(OC₂H₅)−O−[ring]−CH₃ | 0.1 / 0.01 | 100 / 100 |
| (11) (C₂H₅O)₂P(S)−N−N, C₂H₅O−P(S)(C₆H₅)−O−[ring]−CH₃ | 0.1 / 0.01 | 100 / 100 |
| (12) (C₂H₅)(C₂H₅O)P(S)−N−N, (CH₃O)₂P(S)−O−[ring]−CH₃ | 0.1 / 0.01 | 100 / 100 |
| (13) (C₂H₅)(C₂H₅O)P(S)−N−N, (C₂H₅O)₂P(S)−O−[ring]−CH₃ | 0.1 / 0.01 | 100 / 95 |
| (14) (C₂H₅)(C₂H₅O)P(S)−N−N, (C₂H₅O)₂P(O)−O−[ring]−CH₃ | 0.1 / 0.01 | 100 / 100 |
| (15) (C₂H₅)(C₂H₅O)P(S)−N−N, C₂H₅−P(S)(OC₂H₅)−O−[ring]−CH₃ | 0.1 / 0.01 | 100 / 95 |

EXAMPLE 3

*Myzus test* (contact action)
Solvent Emulsifier: 3 parts by weight of acetone
1 part by weight of alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration.

Cabbage plants (*Brassica oleracea*) which have been heavily infested with peach aphids (*Myzus persicae*) are sprayed with the preparation of the active compound until dripping wet.

After the specified period of time, the degree of destruction is determined as a percentage: 100 percent means that all the aphids are killed whereas 0 percent means that none of the aphids are killed.

The active compounds, the concentrations of the active compounds, the evaluation times and the results can be seen from Table 3.

TABLE 3

Myzus test

| Active compound (constitution) | Active compound concentration in percent | Degree of destruction in percent after 24 hours |
|---|---|---|
| (A) (CH₃O)₂P(S)−O−[ring, HN−N]−CH₃ (known) | 0.1 | 0 |
| (18) (CH₃O)₂P(S)−N−N, (CH₃O)₂P(S)−O−[ring]−CH₃ | 0.1 / 0.01 | 100 / 98 |
| (19) (CH₃O)₂P(S)−O−N−N, (C₂H₅O)₂P(S)−O−[ring]−CH₃ | 0.1 / 0.01 | 100 / 99 |
| (4) (CH₃O)₂P(S)−O−N−N, (C₂H₅O)₂P(O)−O−[ring]−CH₃ | 0.1 / 0.01 | 100 / 75 |
| (5) (C₂H₅O)₂P(S)−N−N, (CH₃O)₂P(S)−O−[ring]−CH₃ | 0.1 / 0.01 | 100 / 99 |
| (6) (C₂H₅O)₂P(O)−N−N, (CH₃O)₂P(S)−O−[ring]−CH₃ | 0.1 / 0.01 | 100 / 98 |
| (1) (C₂H₅O)₂P(S)−N−N, (C₂H₅O)₂P(S)−O−[ring]−CH₃ | 0.1 / 0.01 | 100 / 98 |
| (7) (C₂H₅O)₂P(S)−N−N, (C₂H₅O)₂P(O)−O−[ring]−CH₃ | 0.1 / 0.01 | 99 / 70 |
| (8) (C₂H₅O)₂P(O)−N−N, (C₂H₅O)₂P(O)−O−[ring]−CH₃ | 0.1 / 0.01 | 100 / 95 |
| (9) (CH₃O)₂P(S)−N−N, C₂H₅−P(S)(OC₂H₅)−O−[ring]−CH₃ | 0.1 / 0.01 | 100 / 99 |
| (10) (C₂H₅O)₂P(S)−N−N, C₂H₅−P(S)(OC₂H₅)−O−[ring]−CH₃ | 0.1 / 0.01 | 100 / 99 |

TABLE 3—Continued

Myzus test

| Active compound (constitution) | Active compound concentration in percent | Degree of destruction in percent after 24 hours |
| --- | --- | --- |
| (12) $(C_2H_5O)(C_2H_5S)P(=S)-N-N=C(CH_3)-CH=C-O-P(=S)(OCH_3)_2$ (pyrazole ring) | 0.1<br>0.01<br>0.001 | 100<br>100<br>50 |
| (13) $(C_2H_5O)(C_2H_5S)P(=S)-N-N=C(CH_3)-CH=C-O-P(=S)(OC_2H_5)_2$ | 0.1<br>0.01 | 100<br>95 |
| (14) $(C_2H_5O)(C_2H_5S)P(=S)-N-N=C(CH_3)-CH=C-O-P(=O)(OC_2H_5)_2$ | 0.1<br>0.01 | 100<br>75 |
| (15) $(C_2H_5O)(C_2H_5S)P(=S)-N-N=C(CH_3)-CH=C-O-P(=S)(C_2H_5)(OC_2H_5)$ | 0.1<br>0.01<br>0.001 | 100<br>99<br>40 |
| (17) $(C_2H_5O)(C_2H_5S)P(=S)-N-N=C(CH_3)-CH=C-O-P(=O)(N(CH_3)_2)_2$ | 0.1<br>0.01 | 100<br>60 |

EXAMPLE 4

*Tetranychus test*

Solvent Emulsifier:    3 parts by weight of acetone
1 part by weight of alkylaryl polyglycol ether To produce a suitable preparation of the particular active compound, 1 part by weight of the active compound is mixed with the stated amount of solvent containing the stated amount of emulsifier and the concentrate so obtained is diluted with water to the desired final concentration.

Bean plants (*Phaseolus vulgaris*) which have a height of approximately 10–30 cm., are sprayed with the preparation of the active compound until dripping wet. These bean plants are heavily infested with spider mites (*Tetranychus urticae*) in all stages of development.

After the specified period of time, the effectiveness of the preparation of the given active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from Table 4.

TABLE 4

*Tetranychus urticae* resistant/Wiesmoor

| Active compound (constitution) | Active compound concentration in percent | Degree of destruction in percent after 48 hours |
| --- | --- | --- |
| (A) $(CH_3O)_2P(=S)-O-$ [pyrazole, HN, CH_3] (known) | 0.1 | 0 |
| (B) $(C_2H_5O)_2P(=S)-O-$ [pyrazole, HN, CH_3] (known) | 0.1 | 0 |
| (4) $(CH_3O)_2P(=S)-N-N, (C_2H_5O)_2P(=O)-O-, CH_3$ | 0.1 | 99 |
| (6) $(C_2H_5O)_2P(=O)-N-N, (CH_3O)_2P(=S)-O-, CH_3$ | 0.1 | 100 |
| (1) $(C_2H_5O)_2P(=S)-N-N, (C_2H_5O)_2P(=S)-O-, CH_3$ | 0.1 | 98 |
| (7) $(C_2H_5O)_2P(=S)-N-N, (C_2H_5O)_2P(=O)-O-, CH_3$ | 0.1 | 100 |
| (8) $(C_2H_5O)_2P(=O)-N-N, (C_2H_5O)_2P(=O)-O-, CH_3$ | 0.1 | 100 |
| (10) $(C_2H_5O)_2P(=S)-N-N, (C_2H_5)(C_2H_5O)P(=S)-O-, CH_3$ | 0.1 | 90 |
| (13) $(C_2H_5)(C_2H_5O)P(=S)-N-N, (C_2H_5O)_2P(=S)-O-, CH_3$ | 0.1 | 90 |
| (14) $(C_2H_5)(C_2H_5O)P(=S)-N-N, (C_2H_5O)_2P(=O)-O-, CH_3$ | 0.1 | 100 |

TABLE 4 — Continued

*Tetranychus urticae* resistant/Wiesmoor

| Active compound (constitution) | Active compound concentration in percent | Degree of destruction in percent after 48 hours |
|---|---|---|
| (15) 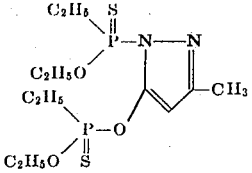 | 0.1 | 99 |

EXAMPLE 5

Critical Concentration Test/Soil Insects
Test insect: Cabbage fly maggots (*Phorbia brassica*)
Solvent: 3 parts by weight of acetone
Emulsifier: 1 part by weight of alkylaryl polyglycol ether.

To produce a suitable preparation of the particular active compound, 1 part by weight of active compound is mixed with the stated amount of solvent, the stated amount of emulsifier is added and the concentrate is diluted with water to the desired final concentration. The preparation of active compound is intimately mixed with the soil. The concentration of the active compound in the preparation is of practically no importance; only the amount by weight of active compound per unit volume of soil, which is given in p.p.m., (e.g. mg/1), is decisive. The soil is filled into pots and the pots are left to stand at room temperature. After 24 hours the test insects are put into the treated soil and after a further 48 hours the degree of effectiveness of the active compound is determined as a percentage by counting the dead and living test insects. The degree of effectiveness is 100 percent when all the test insects have been killed; it is 0 percent when exactly as many test insects are still alive as in the case of the control.

The active compounds, the amounts applied and the results can be seen from Table 5.

TABLE 5
Phorbia test

| Active compound (constitution) | Active compound concentration in p.p.m. | Degree of destruction in percent |
|---|---|---|
| (10) | 20 | 100 |
|  | 10 | 90 |
| (9) | 20 | 100 |
|  | 10 | 80 |
| (19) | 20 | 100 |
|  | 10 | 0 |
| (15) | 20 | 95 |
|  | 10 | 50 |
| (C) (known) | 20 | 0 |
|  | 10 | 0 |

EXAMPLE 6

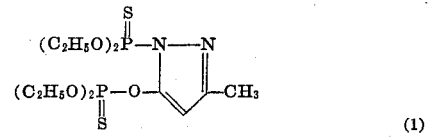

(1)

83 g of the sodium salt of 0,0-diethyl-(3-methyl-5-hydroxy-pyrazolyl-1)-thionophosphoric acid ester in 400 ml of acetone are reacted with 57 g of 0,0-diethylthionophosphoric acid ester chloride for 2 hours at 50° to 60° C. Thereafter the batch is poured into water, extracted by shaking with benzene, the benzene extract is dried, the solvent evaporated and the residue slightly distilled.

The yield is 108 g (90 percent of the theory) and the refractive index: $n_D^{26} = 1.5052$.

Calculated for $C_{12}H_{24}O_5N_2S_2P_2$ (molecular weight 402):

|  | N | S | P |
|---|---|---|---|
| Found: | 6.95%; | 15.9%; | 15.4% |
|  | 7.12%; | 15.96%; | 15.60%. |

The following compounds can be manufactured analogously:

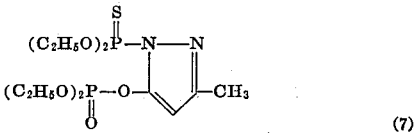

(7)

Yield: 96 percent of theory, refractive index: $n_D^{20} = 1.4850$

Calculated for $C_{12}H_{24}O_6N_2SP_2$ (molecular weight 386):

|  | N | S | P |
|---|---|---|---|
|  | 7.25%; | 8.3%; | 16.10%; |
| Found: | 7.64%; | 8.20%; | 16.31%. |

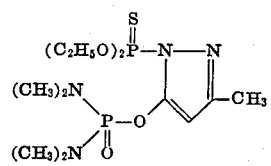

(16)

Yield: 92 percent of theory, refractive index: $n_D^{21} = 1.5069$

Calculated for $C_{12}H_{26}O_4N_4SP_2$ (molecular weight 384):

|  | N | S | P |
|---|---|---|---|
|  | 14.6%; | 8.35%; | 16.15%; |
| Found: | 14.77%; | 8.25%; | 16.23%. |

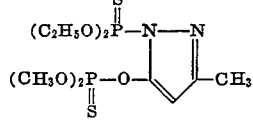
(5)

Yield: 93 percent of theory, refractive index: $n_D^{21} =$ 1.5165

Calculated for $C_{11}H_{20}O_5N_2S_2P_2$ (molecular weight 374)

|  | N | S | P |
|---|---|---|---|
|  | 7.5%; | 17.1%; | 16.6%; |
| Found: | 7.98; | 16.81%; | 16.55%. |

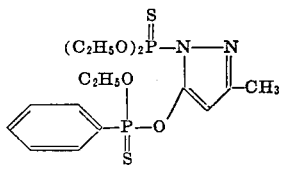
(11)

Yield: 95 percent of theory, refractive index: $n_D^{21} =$ 1.5580

Calculated for $C_{16}H_{24}O_4N_2S_2P_2$ (molecular weight 434):

|  | S | P |
|---|---|---|
|  | 14.75%; | 14.3%; |
| Found: | 14.47%; | 14.51%. |

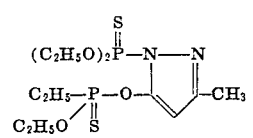
(10)

Yield: 92 percent of theory, refractive index: $n_D^{21} =$ 1.5200

Calculated for $C_{12}H_{24}O_4N_2S_2P_2$ (molecular weight 386):

|  | N | S | P |
|---|---|---|---|
|  | 7.25%; | 16.6%; | 16.1%; |
| Found: | 7.52%; | 16.41%; | 16.37%. |

The sodium salt of 0,0-diethyl-(3-methyl-5-hydroxy-pyrazolyl-1)-thionophosphoric acid ester required as the starting material can for example be obtained as follows:

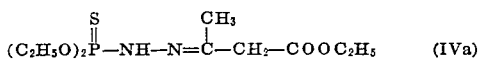
(IVa)

92 g of 0,0-diethylthionophosphoric acid hydrazide in 500 ml of benzene are heated together with 65 g of aceto-acetic acid ethyl ester and the resulting water is at the same time removed by azeotropic distillation. Thereafter the solvent is stripped and the residue is slightly distilled.

The yield is 124 g (99 percent of theory), refractive index: $n_D^{22} = 1.4959$ Calculated for $C_{10}H_{21}O_4N_2SP$ (molecular weight 296):

|  | S | P |
|---|---|---|
|  | 10.8%; | 10.5%; |
| Found: | 10.77%; | 10.58%. |

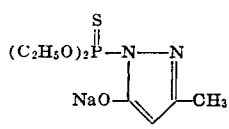
(IIa)

100 g. of the 0,0-diethylthionophosphoryl-hydrazono-acetoacetic acid ethyl ester, dissolved in 400 ml of benzene, are mixed with 0.4 mol of sodium ethylate at 20° to 35° C. After stirring the mixture for 2 hours, the precipitate which has formed is filtered off and dried.

The yield is 60 g (55 percent of theory) and the melting point of the product is 157° C.

Calculated for $C_8H_{14}O_3N_2SPNa$ (molecular weight 272):

|  | N | S | P | Na |
|---|---|---|---|---|
|  | 10.3%; | 11.8%; | 11.4%; | 8.5%; |
| Found: | 9.74%; | 11.79%; | 11.22%; | 8.79%. |

EXAMPLE 7

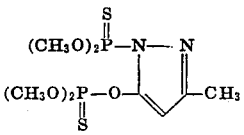
(18)

A solution of 74 g of the sodium salt of 0,0-dimethyl-[3-methyl-5-hydroxypyrazolyl-1]-thionophosphoric acid ester in 400 ml of acetonitrile is mixed with 49 g of 0,0-dimethyl-thionophosphoric acid ester chloride at 30° to 40° C. After stirring the mixture for 2 hours at 30° to 40° C, benzene is added, the batch is extracted by shaking with a little water, the benzene phase is separated off and dried, the solvent is removed and the residue is slightly distilled. The yield is 96 g (92 percent of theory) and the refractive index: $n_D^{20} = 1.5279$.

Calculated for $C_8H_{16}O_5N_2S_2P_2$ (molecular weight 346):

|  | N | S | P |
|---|---|---|---|
|  | 8.1%; | 18.5%; | 17.9%; |
| Found: | 8.47%; | 18.33%; | 18.11%. |

The following products are obtained analogously:

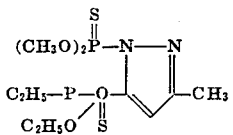
(9)

Yield: 98 percent of theory, refractive index: $n_D^{20} =$ 1.5304.

Calculated for $C_{10}H_{20}O_4N_2S_2P_2$ (molecular weight 358):

|  | S | P |
|---|---|---|
|  | 17.9%; | 17.3%; |
| Found: | 17.93%; | 17.4%. |

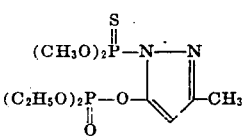
(4)

Yield: 91 percent of theory, refractive index: $n_D^{19} =$ 1.4929

Calculated for $C_{10}H_{20}O_6N_2SP_2$ (molecular weight 358).

|  | S | P |
|---|---|---|
|  | 8.95%; | 17.3%; |
| Found: | 8.89%; | 17.01%. |

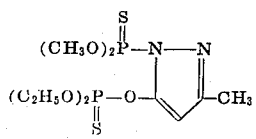

(19)

Yield: 86 percent of theory, refractive index: $n_D^{19} = 1.5165$

Calculated for $C_{10}H_{20}O_5N_2S_2P_2$ (molecular weight 374)

|  | N | S | P |
|---|---|---|---|
|  | 7.5%; | 17.1%; | 16.6%; |
| Found: | 7.98%; | 18.09%; |  |

The requisite starting material can for example be manufactured as follows:

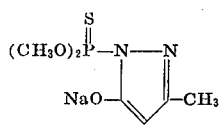

(IIb)

130 g of acetoacetic acid ethyl ester in 500 ml of benzene are mixed with 156 g of 0,0-dimethylthionophosphoric acid ester hydrazide at 30° to 35° C. After stirring the mixture for 1 hour, the water is removed with sodium sulphate, the mixture is filtered and 1 mol of sodium methylate is added to the benzene solution at 25° to 35° C. After stirring for 1 hour, the precipitate is filtered off, washed with ether and dried. The yield is 157 g (64 percent of theory).

Calculated for $C_6H_{10}O_3N_2SPNa$ (molecular weight 244)

|  | N | S | P | Na |
|---|---|---|---|---|
|  | 11.5%; | 13.1%; | 12.7%; | 9.45%; |
| Found: | 11.95%; | 13.26%; | 12.87%; | 9.41%. |

EXAMPLE 8

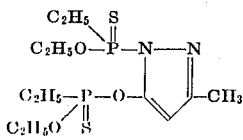

(15)

52 g of the sodium salt of 0-ethyl-ethane-(3-methyl-5-hydroxy-pyrazolyl-1)-thionophosphonic acid ester in 300 ml of acetonitrile are mixed with 35 g of 0-ethylethanethionophosphonic acid ester chloride. After 3 hours stirring at 40° to 50° C the batch is poured into water and taken up in benzene, the benzene phase is separated off and dried, the solvent is stripped off and the residue is slightly distilled.

The yield is 69 g (93 percent of theory), refractive index: $n_D^{21} = 1.5296$.

Calculated for $C_{12}H_{24}O_3N_2S_2P_2$ (molecular weight 370)

|  | S | P |
|---|---|---|
|  | 17.3%; | 16.8%; |
| Found: | 17.4%; | 17.1%. |

The following can be manufactured analogously:

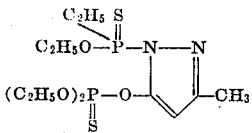

(13)

Yield: 93 percent of theory, refractive index: $n_D^{21} = 1.5171$

Calculated for $C_{12}H_{24}O_4N_2S_2P_2$ (molecular weight 386)

|  | P |
|---|---|
|  | 16.1%; |
| Found | 16.09%. |

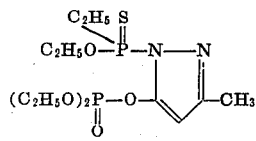

(14)

Yield: 95 percent of theory, refractive index: $n_D^{23} = 1.4938$.

Calculated for $C_{12}H_{24}O_5N_2SP_2$ (molecular weight 370)

|  | N | S | P |
|---|---|---|---|
|  | 7.6%; | 8.65%; | 16.8%; |
| Found: | 7.69%; | 8.45%; | 16.82%. |

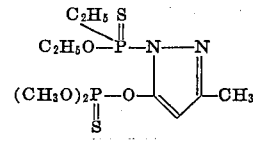

(12)

Yield: 91 percent of theory, refractive index: $n_D^{20} = 1.5286$

Calculated for $C_{10}H_{20}O_4N_2S_2P_2$ (molecular weight 358)

|  | N | S | P |
|---|---|---|---|
|  | 7.85%; | 17.9%; | 17.3%; |
| Found: | 8.02%; | 17.7%; | 17.51%. |

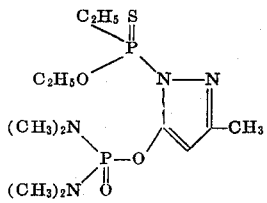

(17)

Yield: 90 percent of theory, refractive index: $n_D^{21} = 1.5170$.

Calculated for $C_{12}H_{26}O_3N_4SP_2$ (molecular weight 368)

|  | S | P |
|---|---|---|
|  | 8.7%; | 16.85%; |
| Found: | 8.88%; | 17.3%. |

The requisite starting material is for example obtainable as follows:

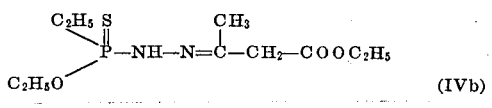

(IVb)

168 g. of 0-ethylethanethionophosphonic acid hydrazide in 500 ml of benzene is mixed with 130 g of acetoacetic acid ethyl ester and the water produced in the reaction is distilled off azeotropically. Thereafter the solvent is stripped off and the residue is slightly distilled.

The yield is 276 g (99 percent of theory), refractive index: $n_D^{21} = 1.5011$.

Calculated for $C_{10}H_{21}O_3N_2SP$ (molecular weight 280)

|        | N      | S      | P      |
|--------|--------|--------|--------|
|        | 10.0%; | 11.4%; | 11.1%; |
| Found: | 10.41%;| 10.86%;| 10.92%.|

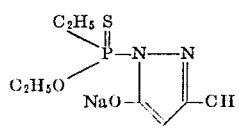
(IIc)

280 g of the O-ethyl-ethanethionophosphonyl-hydrazonoacetoacetic acid ethyl ester manufactured as above, in 800 ml of benzene, are mixed with 1 mol of sodium methylate at 35°C. After stirring the mixture for 1 hour, the precipitate which has formed is filtered off and dried on a clay plate. The yield is 219 g (86 percent of theory). The melting point is 200° C.

Calculated for $C_8H_{14}O_2N_2SPNa$ (molecular weight 256)

|        | N      | S      | P      | Na    |
|--------|--------|--------|--------|-------|
|        | 10.9%; | 12.5%; | 12.1%; | 9.0%; |
| Found: | 11.2%; | 12.63%;| 12.33%;| 8.97%.|

EXAMPLE 9

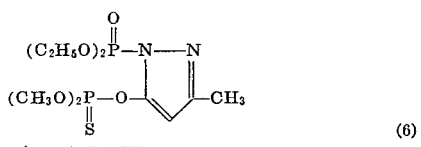
(6)

53 g of the sodium salt of 0,0-diethyl-(3-methyl-5-hydroxy-pyrazolyl-1)-phosphoric acid ester in 300 c.c. of acetonitrile are stirred with 33 g of 0,0-dimethylthionophosphoric acid ester chloride for 3 hours at 40° to 50° C. Thereafter the batch is poured into water and taken up with benzene, the benzene phase is separated off and dried, the solvent is stripped of and the residue is slightly distilled.

The yield is 58 g (81 percent of theory) refractive index: $n_D^{21} = 1.4865$.

Calculated for $C_{10}H_{20}O_6N_2SP_2$ (molecular weight 358)

|        | N     | S      |
|--------|-------|--------|
|        | 7.8%; | 8.95%; |
| Found: | 7.79%;| 9.82%. |

The following compound is obtained analogously:

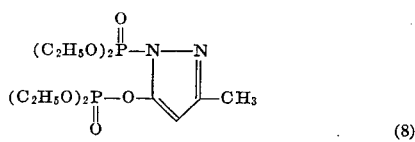
(8)

The sodium salt of the 0,0-diethyl-(3-methyl-5-hydroxy-pyrazolyl-1)-phosphoric acid ester, which serves as the starting material, can for example be obtained as follows:

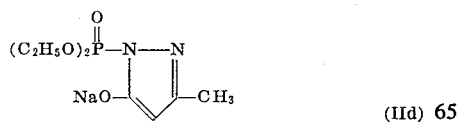
(IId)

168 g of 0,0-diethylphosphoric acid hydrazide are gradually mixed with 130 g of acetoacetic acid ethyl ester. After 30 minutes the mixture is diluted with 500 ml of benzene and dried over sodium sulphate, the dry benzene solution together with 1 mol of sodium methylate is stirred for 1 hour, and the solvent is subsequently stripped off.

The yield is: 217 g (85 percent of theory).

Calculated for $C_8H_{14}O_4N_2PNa$ (molecular weight 256)

|        | Na    |
|--------|-------|
|        | 9.0%; |
| Found: | 8.5%. |

It will be realized that all of the foregoing compounds contemplated by the present invention possess the desired selective pesticidal, especially arthropodicidal, i.e., insecticidal or acaricidal, properties for combating insects and acarids, and that such compounds have a low phytotoxicity and a correspondingly low mammalian toxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What we claim is:
1. A (thiono) phosphoric (phosphonic)-acid ester of the formula

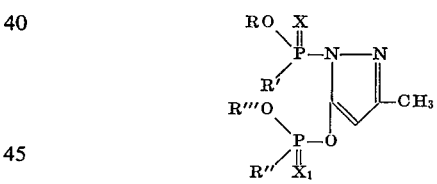

in which

R and R''' are straight-chain or branched lower alkyl

X and $X_1$ are oxygen or sulphur,

R'' is straight-chain or branched lower alkyl, lower alkoxy, mono-lower alkylamino or di-lower alkylamino or phenyl, and R' is straight-chain or branched lower alkyl or lower alkoxy.

2. Compound according to claim 1 wherein R and R''' are alkyl of one to four carbon atoms, R'' has one to four carbon atoms in each alkyl group or is phenyl, and R' has one to four carbon atoms.

3. Compound according to claim 1 wherein such compound is the 0,0-di-methyl-thionophosphoric acid ester 0,0-ethyl-(3-methyl-5-hydroxy-pyrazolyl-1)-thionophosphoric acid ester of the formula

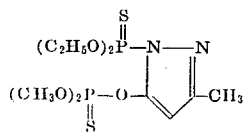

4. Compound according to claim 1 wherein such compound is the 0,0-di-methyl-thionophosphoric acid ester of 0,0-di-ethyl-(3-methyl-5-hydroxy-pyrazolyl-1)-phosphoric acid ester of the formula

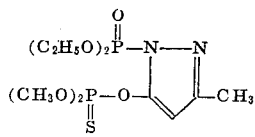

5. Compound according to claim 1 wherein such compound is the 0,0-di-ethyl-thionophosphoric acid ester of 0,0-diethyl-(3-methyl-5-hydroxy-pyrazolyl-1)-thionophosphoric acid ester of the formula

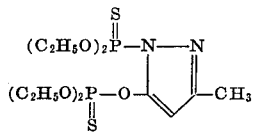

6. Compound according to claim 1 wherein such compound is the 0,0-di-ethyl-phosphoric acid ester of 0,0-di-ethyl-(3-methyl-5-hydroxy-pyrazolyl-1)-thionophosphoric acid ester of the formula

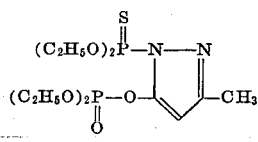

7. Compound according to claim 1 wherein such compound is the 0,0-di-ethyl-phosphoric acid ester of 0,0-diethyl-(3-methyl-5-hydroxy-pyrazolyl-1)-phosphoric acid ester of the formula

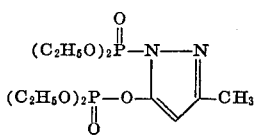

8. Compound according to claim 1 wherein such compound is the 0-ethyl-ethane thionophosphonic acid ester of 0,0-dimethyl-(3-methyl-5-hydroxy-pyrazolyl-1)-thionophosphoric acid ester of the formula

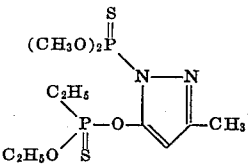

9. Compound according to claim 1 wherein such compound is the 0-ethyl-ethanethionophosphonic acid ester of 0,0-diethyl-(3-methyl-5-hydroxy-pyrazolyl-1)-thionophosphoric acid ester of the formula

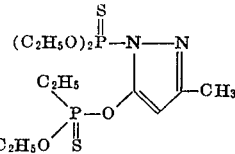

10. Compound according to claim 1 wherein such compound is the 0,0-di-methyl-thionophosphoric acid ester of 0-ethyl-(3-methyl-5-hydroxy-pyrazolyl-1)-ethanethionophosphonic acid ester of the formula

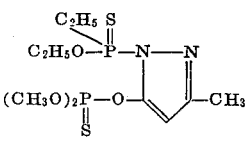

11. Compound according to claim 1 wherein such compound is the 0,0-di-ethyl-phosphoric acid ester of 0-ethyl-(3-methyl-5-hydroxy-pyrazolyl-1)-ethanethionophosphonic acid ester of the formula

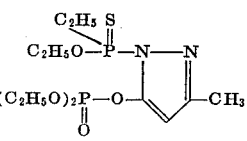

12. Compound according to claim 1 wherein such compound is the 0-ethyl-ethanethionophosphonic acid ester of 0-ethyl-(3-methyl-5-hydroxy-pyrazolyl-1)-ethanethionophosphonic acid ester of the formula

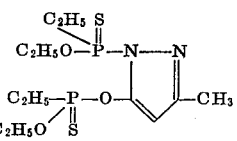

* * * * *

UNITED STATES PATENT OFFICE
CERTIFICATE OF CORRECTION

Patent No. 3,700,687          Dated   October 24, 1972

Inventor(s)  Hellmut Hoffmann et al

It is certified that error appears in the above-identified patent and that said Letters Patent are hereby corrected as shown below:

Column 3, line 23, delete "propyl-methane-phosphonyl)".
Column 4, line 42, change "apply" to --apple--.
Column 4, line 57, change "lepidoptera)" to --(Lepidoptera)--
Column 7, line 59,
Column 9, line 65,
Column 11, line 49, and
Column 13, line 45, cancel "Solvent Emulsifier" and substitute therefor:

> --Solvent:--
> --Emulsifier:--.

Column 15, Table 5, Compound (10), cancel "$(C_3H_5O)_2$" and substitute therefor --$(C_2H_5O)_2$--.

Column 19, line 14, under "S" insert -- 17.01% --;
            under "P" insert -- 16.39% --.

Column 22, line 61, claim 3 - cancel "O,O-ethyl" and substitute therefor --O,O-di-ethyl--.

Signed and sealed this 8th day of May 1973.

(SEAL)
Attest:

EDWARD M. FLETCHER, JR.
Attesting Officer

ROBERT GOTTSCHALK
Commissioner of Patents